US012639860B2

(12) United States Patent
Tian et al.

(10) Patent No.: US 12,639,860 B2
(45) Date of Patent: May 26, 2026

(54) VALENCE OF MESH VERTICES

(71) Applicant: TENCENT AMERICA LLC, Palo Alto, CA (US)

(72) Inventors: Jun Tian, Belle Mead, NJ (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 132 days.

(21) Appl. No.: 18/825,415

(22) Filed: Sep. 5, 2024

(65) Prior Publication Data

US 2025/0124604 A1 Apr. 17, 2025

Related U.S. Application Data

(60) Provisional application No. 63/544,501, filed on Oct. 17, 2023.

(51) Int. Cl.
*G06T 9/00* (2006.01)

(52) U.S. Cl.
CPC ................................... *G06T 9/001* (2013.01)

(58) Field of Classification Search
CPC ...... G06T 9/001; H04N 19/87; H04N 19/146; H04L 47/34
See application file for complete search history.

(56) References Cited

U.S. PATENT DOCUMENTS

| | | | | |
|---|---|---|---|---|
| 9,984,501 B2 * | 5/2018 | Schmidt | ................... | G06T 19/20 |
| 2010/0008593 A1 * | 1/2010 | Gruetzmacher | ........ | G06T 17/20 |
| | | | | 382/244 |
| 2012/0262444 A1 * | 10/2012 | Stefanoski | ............. | G06T 9/001 |
| | | | | 345/419 |
| 2013/0114910 A1 * | 5/2013 | Mammou | ............... | G06T 9/001 |
| | | | | 382/233 |
| 2017/0358133 A1 * | 12/2017 | Iverson | ................. | G06T 17/205 |
| 2018/0342083 A1 * | 11/2018 | Onno | ......................... | G06T 9/20 |
| 2024/0202980 A1 * | 6/2024 | Nguyen Canh | ........ | H04N 19/20 |
| 2024/0273769 A1 * | 8/2024 | Ignatchenko | ........... | G06T 9/001 |

(Continued)

OTHER PUBLICATIONS

Ingrid Daubechies et al., "Factoring Wavelet Transforms Into Lifting Steps", Sep. 1996, 26 pages.

(Continued)

*Primary Examiner* — Amit Chatly

(74) *Attorney, Agent, or Firm* — Sughrue Mion, PLLC

(57) ABSTRACT

A method and apparatus comprising computer code for mesh coding configured to cause a processor or processors to receive a dynamic input mesh representing a volumetric data of at least one three-dimensional (3D) visual content; determine, for a mesh at a first level of sub-division, a plurality of first vertices, wherein the plurality of first vertices are determined using a mid-point sub-division scheme and a plurality of previous vertices of a mesh at a previous level of sub-division, wherein the mesh at the first level and the mesh at the previous level are generated from the dynamic input mesh; determine a valence of a first vertex among the plurality of first vertices to be a first value based on whether a selected two vertices of the mesh at the first level; and generate a compressed bitstream for the dynamic input mesh based on the valence of the first vertex.

20 Claims, 8 Drawing Sheets

500

510

520

530

(56) References Cited

U.S. PATENT DOCUMENTS

2025/0104285 A1* 3/2025 Gruen .................. G06T 3/4007

OTHER PUBLICATIONS

"Information technology—Coded representation of immersive media—Part 29: Video-based dynamic mesh coding (V-DMC)", ISO 23090-29:2023(E), ISO/IEC JTC 1/SC 29/WG 7, Feb. 10, 2023, 74 pages.
Khaled Mammou et al., "[V-CG] Apple's Dynamic Mesh Coding CfP Response". ISO/IEC JTC 1/SC 29/WG 7 m59281, Apr. 2022, 24 pages.

* cited by examiner

300

500

$S^2$

530

$S^1$

520

$S^0$

510

600

700

705    Receive A Dynamic Input Mesh

710    Determine A Plurality Of First Vertices For A Mesh At A First Level Of Sub-division 715    Determine A Valence Of A First Vertex Among The Plurality Of First Vertices To Be A First Value Based On Vertices Of The Mesh At The First Level Of Sub-division 720    Generating A Compressed Bitstream For The Dynamic Input Mesh

FIG. 8

VALENCE OF MESH VERTICES

CROSS REFERENCE TO RELATED APPLICATION

The present application claims priority to U.S. Provisional Application Nos. 63/544,501, filed on Oct. 17, 2023, the disclosures of which are incorporated herein in their entireties.

FIELD

Embodiments of this disclosure are directed to video coding and decoding. Specifically, embodiments of the present disclosure are to encoding and decoding multiple sub-meshes including coding valences of mesh vertices in motion vector coding.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may include several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

As another example, glTF (GL Transmission Format) is standard being developed from the Khronos Group for the efficient transmission and loading of 3D scenes and models by applications. glTF aims to minimize both the size of 3D assets, and the runtime processing needed to unpack. A geometry compression extension to glTF 2.0 using Google Draco technology is being developed to reduce the size of glTF models and scenes.

SUMMARY

According to an embodiment, a method for mesh compression is provided. The method may be executed by at least one processor, and include: receiving a dynamic input mesh representing a volumetric data of at least one three-dimensional (3D) visual content; determining, for a mesh at a first level of sub-division, a plurality of first vertices, wherein the plurality of first vertices are determined using a mid-point sub-division scheme and a plurality of previous vertices of a mesh at a previous level of sub-division, wherein the mesh at the first level of sub-division and the mesh at the previous level of sub-division are generated from the dynamic input mesh; determining a valence of a first vertex among the plurality of first vertices to be a first value based on whether a selected two vertices are boundary vertices of the mesh at the first level of sub-division; and generating a compressed bitstream for the dynamic input mesh based on the valence of the first vertex.

According to an embodiment, an apparatus for mesh compression may be provided. The apparatus may include at least one memory configured to store program code; and at least one processor configured to read the program code and operate as instructed by the program code. The program code may include first receiving code configured to cause the at least one processor to receive a dynamic input mesh representing a volumetric data of at least one three-dimensional (3D) visual content; first determining code configured to cause the at least one processor to determine, for a mesh at a first level of sub-division, a plurality of first vertices, wherein the plurality of first vertices are determined using a mid-point sub-division scheme and a plurality of previous vertices of a mesh at a previous level of sub-division, wherein the mesh at the first level of sub-division and the mesh at the previous level of sub-division are generated from the dynamic input mesh; second determining code configured to cause the at least one processor to determine a valence of a first vertex among the plurality of first vertices to be a first value based on whether a selected two vertices are boundary vertices of the mesh at the first level of sub-division; and generating code configured to cause the at least one processor to generate a compressed bitstream for the dynamic input mesh based on the valence of the first vertex.

According to an embodiment, a non-transitory computer-readable medium storing instructions may be provided. The instructions may include one or more instructions that, when executed by one or more processors of a device for mesh coding, cause the one or more processors to receive a dynamic input mesh representing a volumetric data of at least one three-dimensional (3D) visual content; determine, for a mesh at a first level of sub-division, a plurality of first vertices, wherein the plurality of first vertices are determined using a mid-point sub-division scheme and a plurality of previous vertices of a mesh at a previous level of sub-division, wherein the mesh at the first level of sub-division and the mesh at the previous level of sub-division are generated from the dynamic input mesh; determine a valence of a first vertex among the plurality of first vertices to be a first value based on whether a selected two vertices are boundary vertices of the mesh at the first level of sub-division; and generate a compressed bitstream for the dynamic input mesh based on the valence of the first vertex.

BRIEF DESCRIPTION OF THE DRAWINGS

Further features, nature, and various advantages of the disclosed subject matter will be more apparent from the following detailed description and the accompanying drawings in which:

FIG. 8 is an exemplary diagram of a computer system suitable for implementing embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
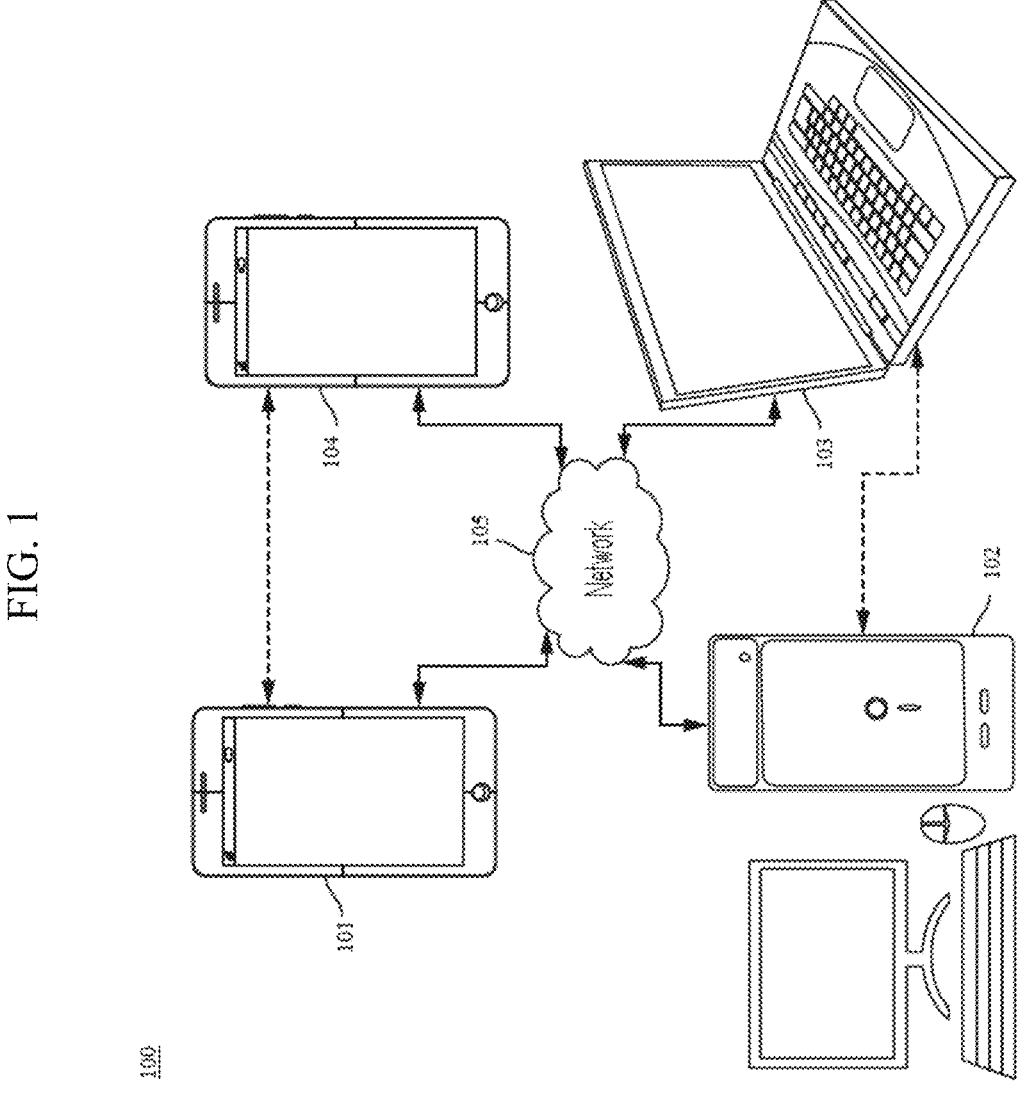
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
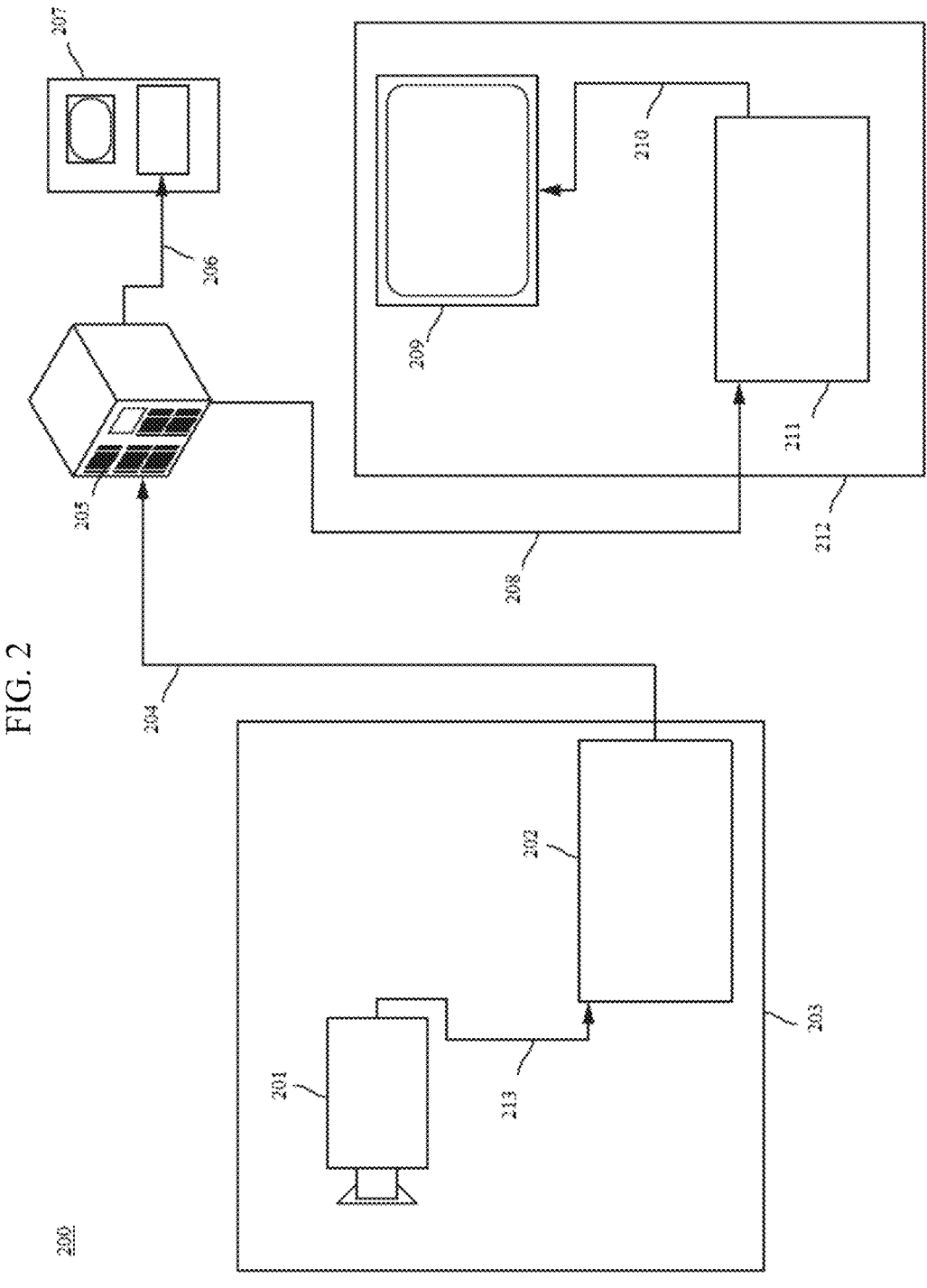
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

According to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 3:
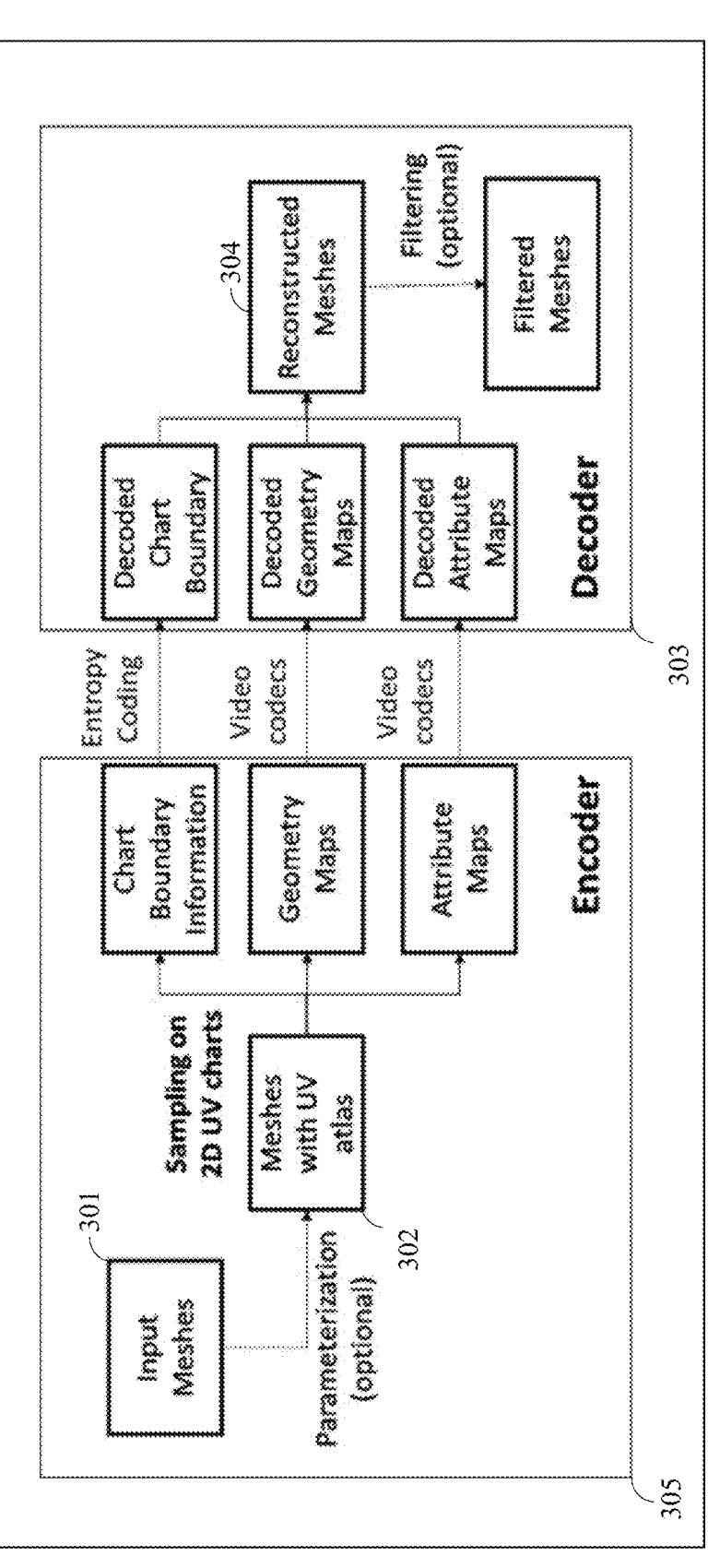
FIG. 3 is a schematic illustration of a simplified block diagram of a video encoder and decoder, in accordance with embodiments of the present disclosure.

FIG. 3 represents an example framework 300 of dynamic mesh compression such as for a 2D atlas sampling based method. Each frame of the input meshes 301 can be pre-processed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 302, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 303 side, the meshes can be reconstructed from the decoded 2D maps. Any post-processing and filtering can also be applied on the reconstructed meshes 304. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

In some implementations, a 3D mesh can be partitioned into several segments (or patches/charts), one or more 3D mesh segments may be considered to be a "3D mesh" according to exemplary embodiments. Each segment is composed of a set of connected vertices associated with their geometry, attribute, and connectivity information.

Dual Degree mesh coding is a specialized technique aimed at efficiently encoding and decoding the connectivity of polygon meshes. Through the principle of duality, dual degree mesh coding enables encoding and decoding connectivity data of sub-meshes by constructing two separate sequences: one characterizing the valence of vertices and the other depicting the degrees of faces.

Figure 4:
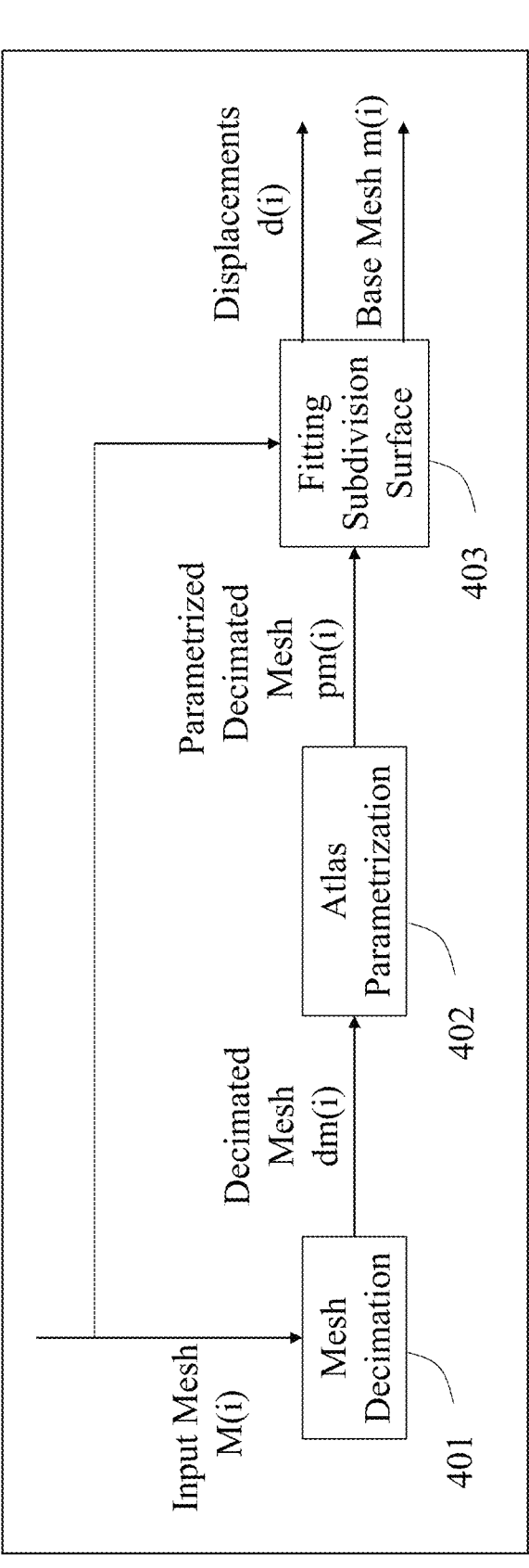
FIG. 4 is a schematic illustration of a simplified block diagram of a pre-processing performed on an input mesh, in accordance with embodiments of the present disclosure.

FIG. 4 illustrates a mesh encoding pre-process 400. The mesh encoding process starts with a pre-processing.

The pre-processing converts the input dynamic mesh, denoted M(i), into a base mesh m(i) together with a set of displacements d(i). The encoder compresses this new representation and generates a compressed bitstream b(i).

The pre-processing includes mesh decimation, followed by atlas parameterization, and then subdivision surface fitting, as illustrated in FIG. 4. The mesh decimation 401 uses a simplification technique, to decimate the input mesh M(i) and produce the decimated mesh dm(i). At the mesh decimation 401, mesh topology is reduced to the base mesh. The base mesh is coded with an existing coding solution such as draco or other Edgebreaker implementation.

The decimated mesh dm(i) is then re-parameterized using atlas parameterization 402. An attribute map of the original mesh frame is re-parametrized in accordance with the decimated base mesh by atlas parameterization 402. An attribute map is coded using existing video coding solution. Applying re-parameterization to the input mesh makes it possible to generate a lower number of patches. This reduces parameterization discontinuities and may lead to better RD performance. The generated mesh is a parameterized decimated mesh denoted as pm(i).

The subdivision surface fitting 403 takes as input the parameterized decimated mesh pm(i) and the input mesh M(i) and produces the base mesh m(i) together with a set of displacements d(i). First, pm(i) is subdivided by applying the subdivision scheme, e.g., mid-point sub-division scheme. The displacement field d(i) is computed by determining for each vertex of the subdivided mesh the nearest point on the surface of the original mesh M(i).

Figure 5:
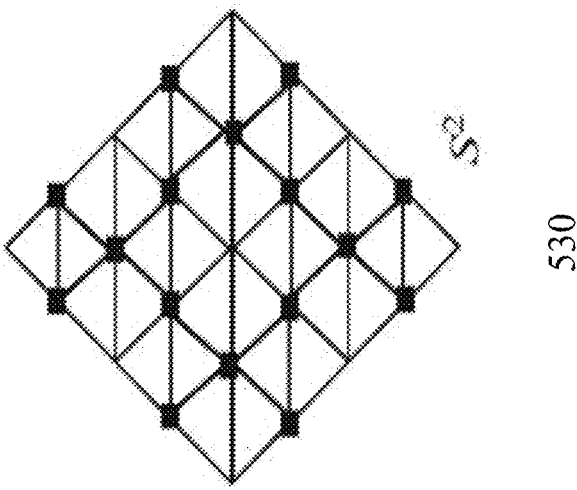
FIG. 5 is a schematic illustration of a mid-point subdivision scheme, in accordance with embodiments of the present disclosure.
Figure 5:
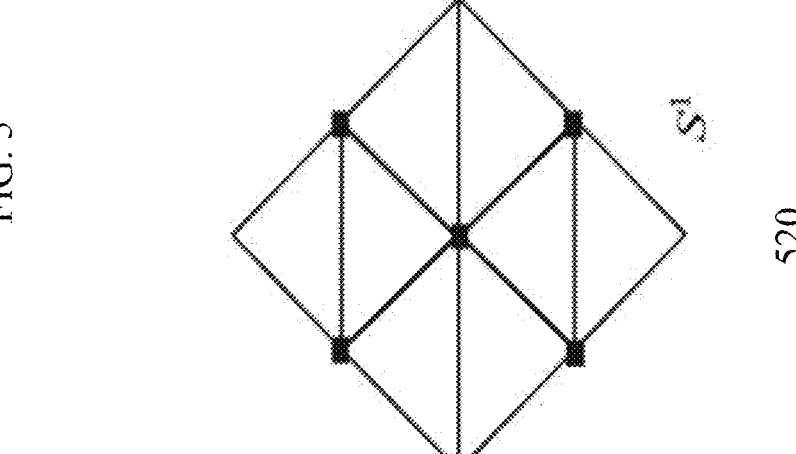
Figure 5:
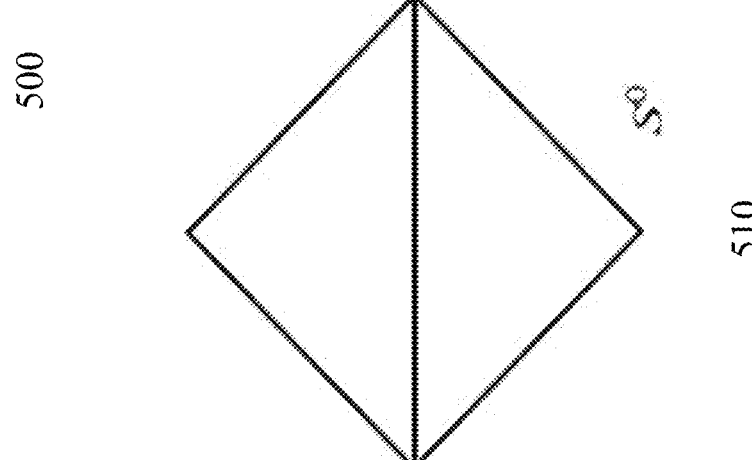

Accordingly, at the subdivision stage the base mesh is subdivided using predefined algorithm. The subdivided mesh is later on fitted to the original input mesh surface and corresponding displacement vectors formulate a displacement component that is further transformed with a wavelet transform and the transformation coefficients may be further quantized FIG. 5 illustrates an application of a mid-point subdivision scheme on a mesh. As explained earlier, pm(i) is subdivided by applying the mid-point subdivision scheme, which at each subdivision iteration subdivides each triangle into 4 sub-triangles as shown in FIG. 5. During each mid-point subdivision, the mid-point subdivision level is increased by 1. The displacement field d(i) is computed by determining for each vertex of the subdivided mesh the nearest point on the surface of the original mesh M(i).

The encoder could encode a set of displacement vectors associated with the subdivided mesh vertices, referred to as the displacement field d(i). First, the reconstructed quantized base mesh m'(i) may be used to update the displacement field d(i) to generate an updated displacement field d'(i). A wavelet transform may then applied to d'(i) and a set of wavelet coefficients may be generated. The wavelet coefficients may then be quantized, and may be compressed by using arithmetic coding, a traditional image/video encoder, or some other encoder.

Figure 6:
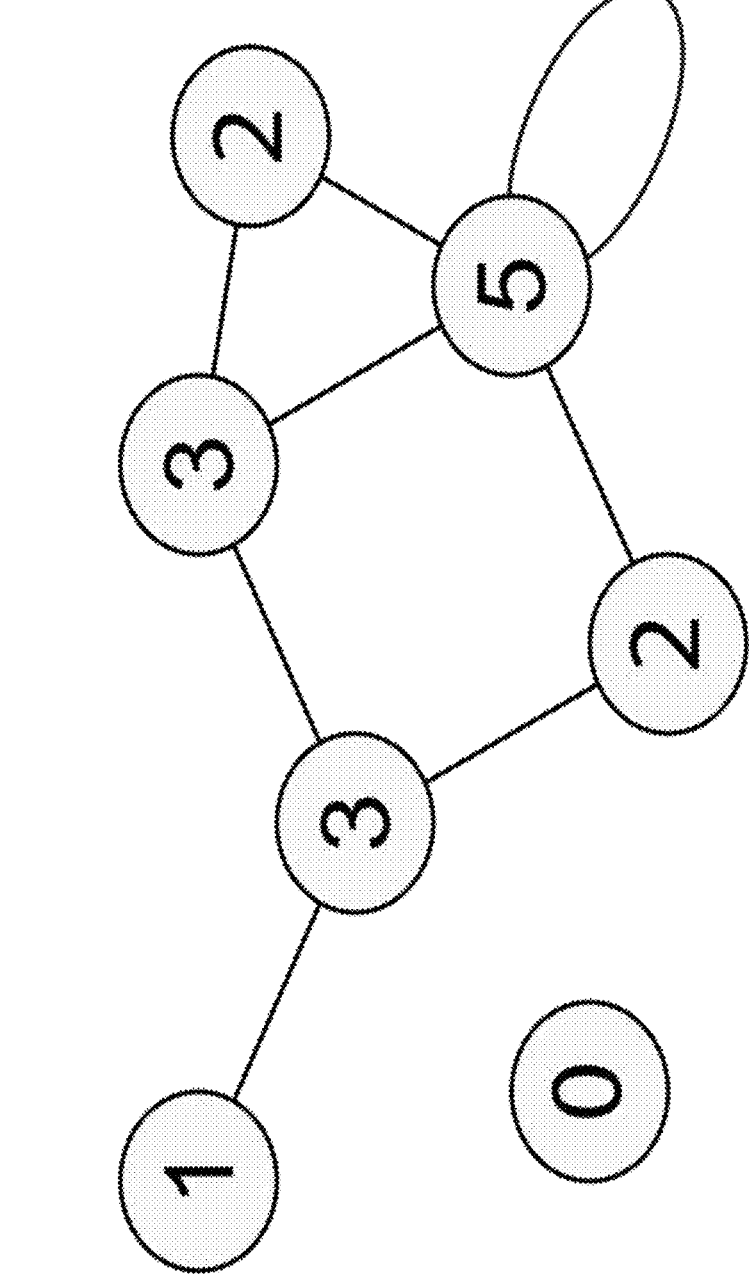
FIG. 6 is a schematic illustration of a vertices in a mesh labelled by their valences, in accordance with embodiments of the present disclosure.

The valence of a vertex is utilized in the wavelet transform. The valence of a vertex is the number of edges that are incident to the vertex. FIG. 6 gives an example where vertices are labeled by their valences.

The valence of a vertex can be computed by counting the number of edges that are incident to the vertex. For a mesh subdivided by the mid-point subdivision scheme, embodiments propose a faster approach to compute the valence.

It should be understood that the proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

According to an embodiment, a number of methods and systems may be proposed for computing the valence of vertices in a mesh. It should be understood that they can be applied individually or by any form of combinations. Further, it should be understood that the disclosed methods and systems are not limited to mesh compression. They can also be applied to, for example, audio processing, image processing, video processing, or signal processing in general.

In a mesh subdivided by mid-point subdivision, at the first subdivision iteration, the input is referred as the level 0 mesh. As an example, in FIG. 5, mesh 510 may be a level 0 mesh; mesh 520 may be a level 1 mesh; and mesh 530 may be a level 2 mesh.

For a level 0 mesh or any mesh at a previous level of a current mesh, the valence of each vertex may be determined by computing the number of edges that are incident to the vertex. In addition, for each vertex at level 0, it may be classified as either a boundary vertex or a non-boundary vertex. A vertex is a boundary vertex if it is the end-point of an edge which is on the boundary of a mesh; otherwise, it is non-boundary vertex.

During the i-th subdivision iteration, where i is a positive integer, the level i mesh is generated, where additional vertices are generated from the level i−1 by adding mid-points at the edges of the level i mesh, and connect these additional vertices with the mid-point subdivision scheme as illustrated in FIG. 5 using mesh 530 and mesh 520.

For a generated vertex v at the level i mesh, it is assumed that it is in the mid-point of the edge $(v_1, v_2)$, the valence of v may be determined as follows:

If both $v_1$ and $v_2$ are both non-boundary vertex, the valence of v must be 6. In addition, v may be classified as a non-boundary vertex.

If one of $v_1$ and $v_2$ is a boundary vertex, or both of $v_1$ and $v_2$ are boundary vertices, the valence of v may be computed by computing the number of edges that are incident to the vertex. In addition, v may be classified as a boundary vertex or a non-boundary vertex by checking if the edge $(v_1, v_2)$ is a boundary of the mesh.

Figure 7:
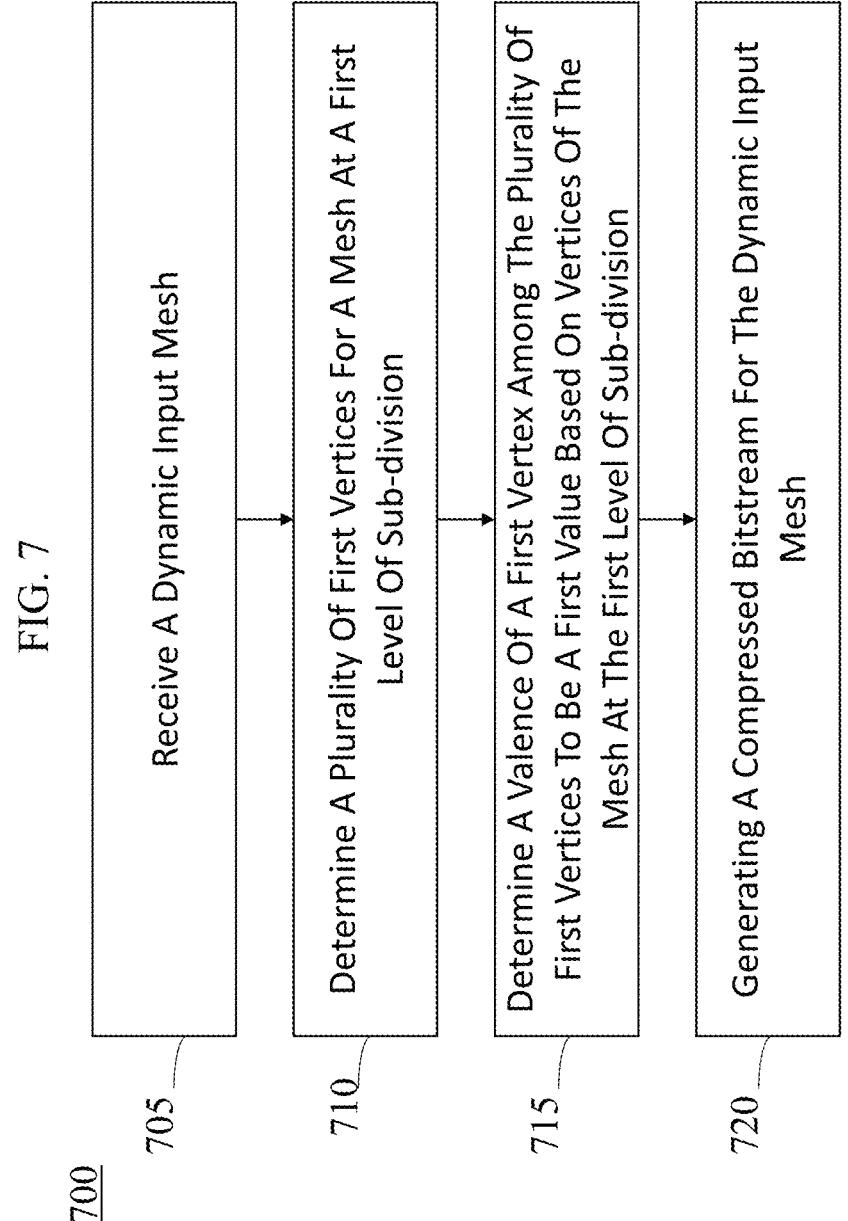
FIG. 7 is a flowchart of a process for mesh compression, in accordance with embodiments of the present disclosure.

FIG. 7 illustrates a process 700 for mesh compression based on determining the valence of mesh vertices.

As shown in FIG. 7, at operation 705, a dynamic input mesh representing a volumetric data of at least one three-dimensional (3D) visual content may be received. As an example, mesh 510 may be received.

Operation 710 may include determining, for a mesh at a first level of sub-division, a plurality of first vertices, where the plurality of first vertices are determined using a mid-point sub-division scheme and a plurality of previous vertices of a mesh at a previous level of sub-division. The mesh at the first level of sub-division and the mesh at the previous level of sub-division are generated from the dynamic input mesh using iterations of a mid-point sub-division scheme. As an example, vertices of mesh 530 may be determined using a mid-point sub-division scheme applied to a plurality of previous vertices of mesh 520, which is A mesh at a previous level of sub-division.

At operation 715, a valence of a first vertex among the plurality of first vertices may be determined to be a first value based on whether a selected two vertices are boundary vertices of the mesh at the first level of sub-division.

In embodiments, the first vertex is a mid-point of an edge of the mesh at the previous level of sub-division and the edge of the mesh at the previous level of sub-division comprises a first edge vertex and a second edge vertex.

Then, the first edge vertex and the second edge vertex may be selected as the selected two vertices. Then, the determining the valence of the first vertex may include determining whether the selected two vertices are non-boundary vertices; and based on determining that the selected two vertices are non-boundary vertices, determining that the valence of the first vertex is a predetermined value. It may also be determined that the first vertex is a non-boundary vertex In a same or other embodiment, the determining the valence of the first vertex may include determining that at least one of the selected two vertices is a boundary vertex; and based on determining that the at least one of the selected two vertices is a boundary vertex, determining that the valence of the first vertex is equal to a number of edges incident to the first vertex. It may also be determined that the first vertex is a boundary vertex in response to the first edge vertex and the second edge vertex forming a boundary edge of the mesh at the first level of sub-division.

Then, for each vertex in the mesh at the previous level of sub-division, whether a respective vertex is a boundary vertex or a non-boundary vertex may be determined.

At operation 720, a compressed bitstream for the dynamic input mesh may be generated based on the valence of the first vertex.

It may be understood that the process 700 may describe an encoding process, but a person of skill in the art will know that similar operations may be performed in a modified order for a decoding process.

The proposed methods may be used separately or combined in any order. The proposed methods may be used for arbitrary polygon mesh, but even though only a triangle mesh may have been used for demonstration of various embodiments. As noted above, it will be assumed that an input mesh may contain one or multiple instances, that a sub-mesh is a part of input mesh with an instance or multiple instances, and that multiple instances can be grouped to form a sub-mesh.

The techniques described above, can be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
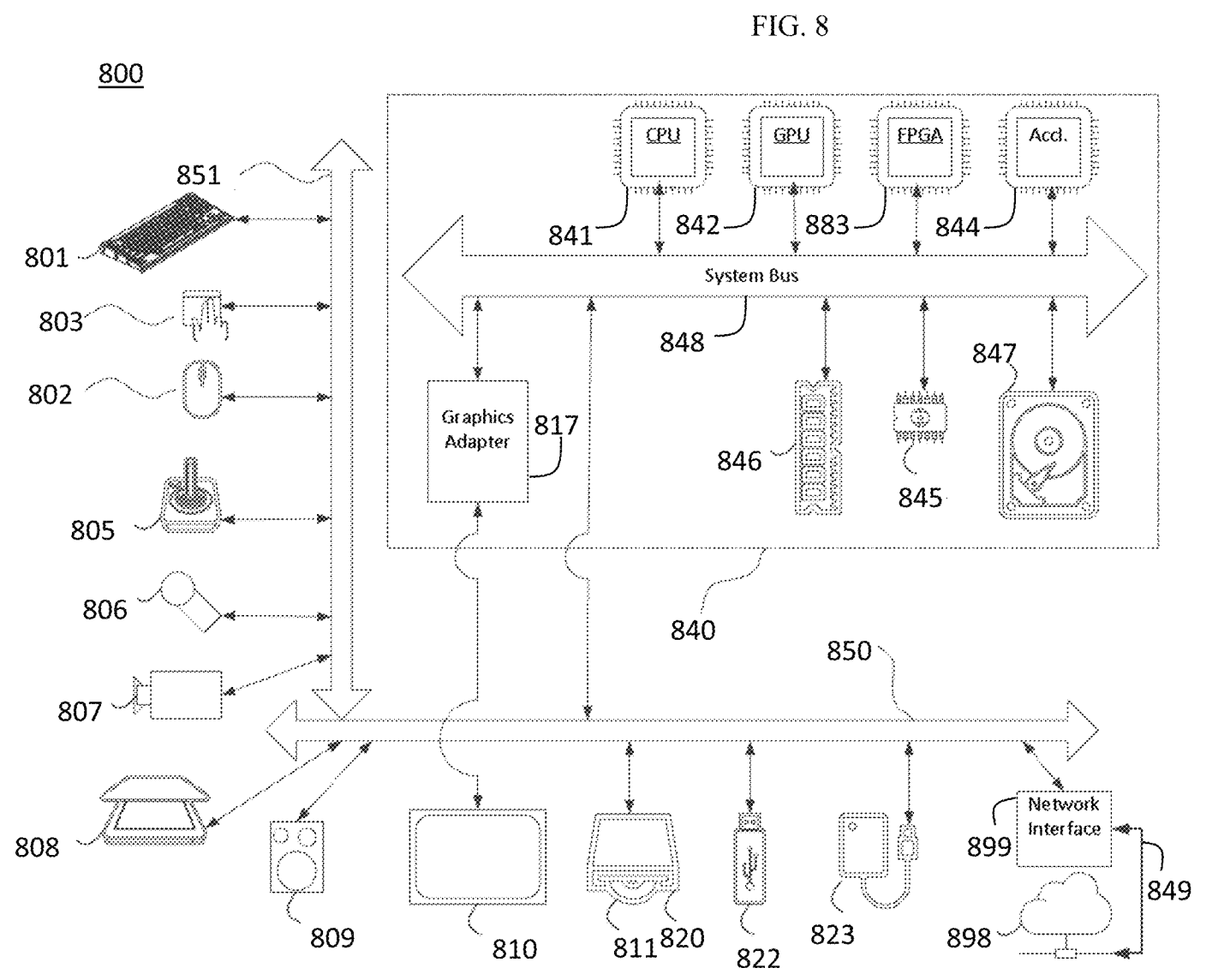

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface 899 to one or more communication networks 898. Networks 898 can for example be wireless, wireline, optical. Networks 898 can further be local, wide-area, metropolitan, vehicular and industrial, real-time, delay-tolerant, and so on. Examples of networks 898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (750 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieval to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh compression, the method being executed by at least one processor, the method comprising:

receiving a dynamic input mesh representing a volumetric data of at least one three-dimensional (3D) visual content;

determining, for a mesh at a first level of sub-division, a plurality of first vertices, wherein the plurality of first vertices are determined using a mid-point sub-division scheme and a plurality of previous vertices of a mesh at a previous level of sub-division, wherein the mesh at the first level of sub-division and the mesh at the previous level of sub-division are generated from the dynamic input mesh;

determining a valence of a first vertex among the plurality of first vertices to be a first value based on whether a selected two vertices are boundary vertices of the mesh at the first level of sub-division; and generating a compressed bitstream for the dynamic input mesh based on the valence of the first vertex.

2. The method of claim 1, wherein the first vertex is a mid-point of an edge of the mesh at the previous level of sub-division, wherein the edge of the mesh at the previous level of sub-division comprises a first edge vertex and a second edge vertex; and wherein the method further comprises:

selecting the first edge vertex and the second edge vertex as the selected two vertices.

3. The method of claim 2, wherein the determining the valence of the first vertex comprises:

determining whether the selected two vertices are non-boundary vertices; and based on determining that the selected two vertices are non-boundary vertices, determining that the valence of the first vertex is a predetermined value.

4. The method of claim 3, wherein the method further comprises:

determining that the first vertex is a non-boundary vertex.

5. The method of claim 2, wherein the determining the valence of the first vertex comprises:

determining that at least one of the selected two vertices is a boundary vertex; and based on determining that the at least one of the selected two vertices is a boundary vertex, determining that the valence of the first vertex is equal to a number of edges incident to the first vertex.

6. The method of claim 5, wherein the method further comprises:

determining that the first vertex is a boundary vertex in response to the first edge vertex and the second edge vertex forming a boundary edge of the mesh at the first level of sub-division.

7. The method of claim 1, wherein the method further comprising:

for each vertex in the mesh at the previous level of sub-division, determining whether a respective vertex is a boundary vertex or a non-boundary vertex.

8. An apparatus for mesh compression, the apparatus comprising:

at least one memory configured to store program code; and at least one processor configured to read the program code and operate as instructed by the program code, the program code including:

first receiving code configured to cause the at least one processor to receive a dynamic input mesh representing a volumetric data of at least one three-dimensional (3D) visual content;

first determining code configured to cause the at least one processor to determine, for a mesh at a first level of sub-division, a plurality of first vertices, wherein the plurality of first vertices are determined using a mid-point sub-division scheme and a plurality of previous vertices of a mesh at a previous level of sub-division, wherein the mesh at the first level of sub-division and the mesh at the previous level of sub-division are generated from the dynamic input mesh;

second determining code configured to cause the at least one processor to determine a valence of a first vertex among the plurality of first vertices to be a first value based on whether a selected two vertices are boundary vertices of the mesh at the first level of sub-division; and generating code configured to cause the at least one processor to generate a compressed bitstream for the dynamic input mesh based on the valence of the first vertex.

9. The apparatus of claim 8, wherein the first vertex is a mid-point of an edge of the mesh at the previous level of sub-division, wherein the edge of the mesh at the previous level of sub-division comprises a first edge vertex and a second edge vertex; and wherein the program code further comprises:

first selecting code configured to cause the at least one processor to select the first edge vertex and the second edge vertex as the selected two vertices.

10. The apparatus of claim 9, wherein the second determining code comprises:

third determining code configured to cause the at least one processor to determine whether the selected two vertices are non-boundary vertices; and fourth determining code configured to cause the at least one processor to determine, based on determining that the selected two vertices are non-boundary vertices, that the valence of the first vertex is a predetermined value.

11. The apparatus of claim 10, wherein the program code further comprises:

fifth determining code configured to cause the at least one processor to determine that the first vertex is a non-boundary vertex.

12. The apparatus of claim 9, wherein the second determining code comprises:

sixth determining code configured to cause the at least one processor to determine that at least one of the selected two vertices is a boundary vertex; and seventh determining code configured to cause the at least one processor to determine, based on determining that the at least one of the selected two vertices is a boundary vertex, that the valence of the first vertex is equal to a number of edges incident to the first vertex.

13. The apparatus of claim 12, wherein the program code further comprises:

eighth determining code configured to cause the at least one processor to determine that the first vertex is a boundary vertex in response to the first edge vertex and the second edge vertex forming a boundary edge of the mesh at the first level of sub-division.

14. The apparatus of claim 13, wherein the program code further comprises:

ninth determining code configured to cause the at least one processor to determine, for each vertex in the mesh at the previous level of sub-division, whether a respective vertex is a boundary vertex or a non-boundary vertex.

15. A non-transitory computer-readable medium storing instructions, the instructions comprising: one or more instructions that, when executed by one or more processors of a device for mesh coding, cause the one or more processors to:

receive a dynamic input mesh representing a volumetric data of at least one three-dimensional (3D) visual content;

determine, for a mesh at a first level of sub-division, a plurality of first vertices, wherein the plurality of first vertices are determined using a mid-point sub-division scheme and a plurality of previous vertices of a mesh at a previous level of sub-division, wherein the mesh at the first level of sub-division and the mesh at the previous level of sub-division are generated from the dynamic input mesh;

determine a valence of a first vertex among the plurality of first vertices to be a first value based on whether a selected two vertices are boundary vertices of the mesh at the first level of sub-division; and generate a compressed bitstream for the dynamic input mesh based on the valence of the first vertex.

16. The non-transitory computer-readable medium of claim 15, wherein the first vertex is a mid-point of an edge of the mesh at the previous level of sub-division, wherein the edge of the mesh at the previous level of sub-division comprises a first edge vertex and a second edge vertex; and wherein the one or more instructions further cause the one or more processors to:

select the first edge vertex and the second edge vertex as the selected two vertices.

17. The non-transitory computer-readable medium of claim 16, wherein the determining the valence of the first vertex comprises:

determining whether the selected two vertices are non-boundary vertices; and based on determining that the selected two vertices are non-boundary vertices, determining that the valence of the first vertex is a predetermined value.

18. The non-transitory computer-readable medium of claim 17, wherein the one or more instructions further cause the one or more processors to:

determining that the first vertex is a non-boundary vertex.

19. The non-transitory computer-readable medium of claim 16, wherein the determining the valence of the first vertex comprises:

determining that at least one of the selected two vertices is a boundary vertex; and based on determining that the at least one of the selected two vertices is a boundary vertex, determining that the valence of the first vertex is equal to a number of edges incident to the first vertex.

20. The non-transitory computer-readable medium of claim 19, wherein the one or more instructions further cause the one or more processors to:

determine that the first vertex is a boundary vertex in response to the first edge vertex and the second edge vertex forming a boundary edge of the mesh at the first level of sub-division.

\* \* \* \* \*